(12) United States Patent
Murray et al.

(10) Patent No.: US 7,763,312 B2
(45) Date of Patent: Jul. 27, 2010

(54) DISPERSION OF NANO-ALUMINA IN A RESIN OR SOLVENT SYSTEM

(75) Inventors: Thomas J. Murray, Chesterfield, MO (US); Philip R. Meister, Belleville, IL (US)

(73) Assignee: Elantas PDG, Inc., St. Louis, MO (US)

( * ) Notice: Subject to any disclaimer, the term of this patent is extended or adjusted under 35 U.S.C. 154(b) by 1022 days.

(21) Appl. No.: 11/405,280

(22) Filed: Apr. 17, 2006

(65) Prior Publication Data

US 2007/0243399 A1    Oct. 18, 2007

(51) Int. Cl.
*B05D 5/12* (2006.01)
(52) U.S. Cl. ............... 427/120; 427/117; 427/384
(58) Field of Classification Search .......... 427/117, 427/384, 120; 174/110 R, 127
See application file for complete search history.

(56) References Cited

U.S. PATENT DOCUMENTS

| 4,493,873 | A | 1/1985 | Keane et al. |
|---|---|---|---|
| 4,503,124 | A | 3/1985 | Keane et al. |
| 4,537,804 | A * | 8/1985 | Keane et al. ............... 427/118 |
| 4,546,041 | A | 10/1985 | Keane et al. |
| 5,861,578 | A | 1/1999 | Hake et al. |
| 5,917,155 | A | 6/1999 | Hake et al. |
| 6,056,995 | A | 5/2000 | Hake et al. |
| 6,476,083 | B1 | 11/2002 | Okura et al. |
| 6,649,661 | B2 | 11/2003 | Yoshino et al. |
| 6,939,584 | B2 | 9/2005 | Sankey et al. |
| 2005/0158488 | A1 * | 7/2005 | Oiwamoto et al. ....... 428/32.37 |

* cited by examiner

*Primary Examiner*—Brian K Talbot
(74) *Attorney, Agent, or Firm*—Polster, Lieder, Woodruff & Lucchesi, L.C.

(57) ABSTRACT

Dispersion of sol-derived nano-alumina in an organic solvent mixture containing a 1,2-diol with simple agitation. A thixotropic solution is obtained at 20% alumina in ethylene glycol, while a low viscosity (<100 cps) solution is possible for a 20% alumina in (1:1, N-methylpyrrolidone-ethylene glycol) solution. Alumina particles are de-agglomerated with minimal agitation. The resulting solution or resin solution is stable to settling and re-agglomeration. The nano-alumina dispersion solution can then be mixed with an imide coating to provide for a wire coating to give the wire improved abrasion, COF, and corona resistance.

12 Claims, No Drawings

DISPERSION OF NANO-ALUMINA IN A RESIN OR SOLVENT SYSTEM

CROSS REFERENCE TO RELATED APPLICATIONS

None

STATEMENT REGARDING FEDERALLY SPONSORED RESEARCH OR DEVELOPMENT

Not applicable

BACKGROUND OF THE INVENTION

This invention relates to dispersion of a nano-alumina; and, more particularly, to an improved nano-alumina dispersion for coatings such as wire coatings. Nano-alumina dispersions are used in many coating applications. In electrical insulation applications, nano-alumina dispersions that are thixotropic have been found to produce an even edge build-up on a shaped wire. It has also been found that low loading levels in a polyamideimide overcoat for the wire lowers the coefficient of friction, and improves abrasion resistance of the wire coating. It has further been found that high loading levels (~20% on resin solids) in polyester, polyesterimide, polyamideimide, polyimide or polyurethane coatings achieve a very acceptable corona resistance in inverter duty motors.

Alumina is typically available in a powder form. However, dispersion of the powder in a resin system, or solvent, presents problems. This is because the alumina forms insoluble aggregates that require extreme sheer forces to break down into individual particles. Typical ways of accomplishing this include ultrasound, ball milling, sand milling, and high pressure homogenization, for example. A problem with these and similar techniques, however, is that the resulting dispersion is often inconsistent with the result that the alumina particles settle or re-agglomerate in the resin or solvent system. This leads to coating non-uniformities and quality problems for the end user.

Dispersants commonly used in the coating industry can be used to mitigate these dispersion and settling problems. But, the high loading levels needed with nanoparticles, because of their large surface area, affect the usefulness of the dispersants. Also, the dispersants used are often found to be detrimental to the physical properties required in final, cured coatings. These include poor thermal stability and coating defects. The result is that the high costs incurred in using these dispersant cannot be easily justified.

Fillers such as alumina are common in the electrical insulation coating industry, and there are a number of U.S. patents directed at the use of fillers for improved corona endurance magnet wire. These patents include U.S. Pat. Nos. 6,649,661 and 6,476,083, for example. However, the use of fillers does not solve the problem either.

BRIEF SUMMARY OF THE INVENTION

The present invention is directed to a solution to the above described problem and involves a unique dispersion method that requires only minimal agitation to produce a stable alumina dispersion. Using the method of the invention, a sol derived nano-alumina can be readily dispersed in a resin or solvent system. The dispersion is stable to settling with time, and provides greater homogeneity and consistency to the end user, including the production of final, cured coatings whose physical properties include good thermal stability and no coating defects. The smaller particle size also gives a more flexible coating with fewer defects.

Initially, making of a stable nano-alumina dispersion in accordance with the present invention comprises dispersing a nano-alumina in a dispersion solution containing a 1,2-diol. The 1,2-diol can be ethylene glycol and/or or 1,2-propanediol. The nano-alumina:dispersion solution ratio is about 1:4 to about 1:10.

The nano-alumina can be dispersed in the dispersion solution by, for example, mixing for a selected period of time. Of course, the nano-alumina can be dispersed in the solution by other means as well.

In one aspect of the invention, the dispersion solution can contain a phenolic or amide based solvent. The phenolic solvent can be phenol and/or cresylic acid. The amide solvent can be N-methylpyrolidone or dimethylformamide. In accordance with this aspect of the invention, the dispersion solution would be (a) a solution of ethylene glycol and a phenolic solvent or (b) a solution of ethylene glycol and an amide based solvent. If ethylene glycol is used for the 1,2-diol, the ethylene glycol can be mixed in a ratio of about 1:1 to about 3:1 with the phenolic solvent or the amide based solvent.

In accordance with another aspect, the stable nano-alumina dispersion solution can be mixed with a resin coating. This mixture can then be coated on a wire and cured to provide enhanced physical properties, such as scratch resistance and coefficient of friction, to the wire. The resin coating is chosen from a group consisting of polyamide imide coatings, polyester imide coatings, polyester coatings, polyurethane coatings, polyimide coatings, and combinations thereof. The nano-alumina dispersion solution is mixed with the resin coating in a ratio of about 0.5:100 to about 20:100.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the constructions without departing from the scope of the invention, it is intended that all matter contained in the description shall be interpreted as illustrative and not in a limiting sense.

The present invention is directed to a method of dispersing alumina in an organic solvent or resin system. Inorganic particles such as alumina, when milled or otherwise dispersed, tend to settle and re-agglomerate quickly. There are at least two types of alumina are commercially available: sol-derived alumina (formed using a sol-gel technique) and fumed alumina. Fumed alumina is traditionally prepared by the oxidation of aluminum trichloride in a flame. The resulting solids comprise large aggregates of small particles, with the typical particle size being on the order of 50 nm. The dispersion of fumed alumina in traditional solvents or resins requires a ball mill (or similar type of equipment) to achieve dispersion stability. Even then, however, the stability is limited and the particles tend to settle again over time.

Sol derived alumina, on the other hand, is prepared in water and the result is a homogeneous dispersion with no settling. It is prepared by water hydrolysis of an aluminum alkoxide under either acidic or basic conditions. But, attempts to disperse the solid alumina powder in traditional coating resins or solvents has resulted in a poor dispersion of particles which tend to start settling immediately upon the resin or solvent being left standing.

A stable dispersion of alumina has been obtained using both fumed and sol-derived alumina, when they were dispersed in a 1,2-diol in a ratio of alumina:dispersion solution of about 1:4 to about 1:10. Suitable 1,2-diols include ethylene glycol and 1,2-propanediol. While not tested, other 1,2-diols are also expected to work. A stable dispersion of at least 5 on a Hegman Grind gage was achieved using either a cowles blade or a propeller agitator. The dispersion was homogeneous and did not settle when left standing. Dispersions of about 10-30% alumina on total weight were examined, and it was found that the higher the solids content, the more thixotropic in rheology the mixture became.

A second unique feature of the method of the invention is the effect of the solvent mixtures on the resulting rheological properties. Phenolic solvents such as phenol or cresol produced highly thixotropic dispersions when used in combination with a 1,2-glycol such as ethylene glycol. Solvent mixtures of phenol:ethylene glycol were examined for mixtures ranging from 0:100 to 75:25, respectively, of these two ingredients. This combination of solvents yielded a thixotropic dispersion that was of a translucent color when mixed, produced a Hegman Grind gage reading of 5 or greater, and showed minimal signs of settling when the mixture was left standing. Attempts to disperse the alumina in phenol alone yielded a poor dispersion that quickly settled on standing.

Amide based solvents such as N-methylpyrolidone (NMP) or dimethylformamide (DMF) produced a different result when used in combination with a 1,2-diol. Solvent mixtures of NMP:ethylene glycol were examined in mixtures ranging from 0:100 to 75:25, respectively of these two ingredients. This combination of solvents yielded a low viscosity dispersion that was a translucent color when mixed, produced a Hegman Grind gage reading of 5 or greater, and showed minimal signs of settling. Attempts to disperse the alumina in NMP or DMF alone yielded a poor dispersion that quickly settled on standing.

Other diol solvents were also tested both by themselves, and in combination with NMP or phenol. A 1,3-diol such as 1,3-propanediol yielded a poor dispersion that quickly settled on standing. Other solvents such as aromatic hydrocarbons, dibasic esters and glycol ethers also yielded poor dispersion and quick settling when the mixture was left standing.

The 1,2-diol/solvent mixtures that gave good dispersions were easily incorporated into a resin system with minimal agitation. For example, use of a propeller agitator was found sufficient to obtain a homogeneous dispersion when used in typical wire enamel coatings. It will be apparent to one of ordinary skill in the art that these mixing conditions, and the mixing conditions described in the Examples below do not create high shear mixing conditions. The wire enamels examined included THEIC polyester, THEIC polyesterimide, polyamideimide, and polyurethane coatings. It is also expected that one could disperse the alumina directly into a wire enamel coating that contained either an amide solvent or a phenolic solvent, and a 1,2-diol.

Wire coatings containing an alumina dispersion as described above were compared to wire coatings employing traditional methods of alumina incorporation such as milling. A milled sample of fumed alumina had a D[v, 0.50] of 3.49 microns. The NMP/ethylene glycol alumina dispersion of sol-derived alumina had a D[v, 0.50] of 0.36 microns. The smaller particle size gave excellent coatability on a wire. The smaller particles also should resulted in less die wear, which means less maintenance and machine down time for the wire producer.

The smaller particle size also produces excellent dispersion stability in the final product. A milled sample of fumed alumina in a polyamideimide resin solution tended to settle immediately on standing, giving a non-homogenous sample. Conversely, the NMP/ethylene glycol alumina dispersion of sol-derived alumina in a polyamideimide resin solution was settlement free on standing undisturbed for over one (1) year.

Enamels containing alumina dispersed in an amide or phenolic solvent, and ethylene glycol, were coated and cured on a copper wire. The physical properties of the wire were then examined and compared to a control sample containing fumed alumina milled into the wire enamel. At higher loading levels, each sample had acceptable corona resistance during a pulse endurance test done for inverter duty motors. At low loading levels, improvements in the abrasion resistance and coefficient of friction (COF) were observed in comparison to a control sample that did not contain alumina.

EXAMPLES

Example 1

20 g of a sol derived nano-alumina was added to 80 g of ethylene glycol. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was greater than 8 hegman units. The fineness of grind of the sample was checked using a Hegman Grind Gauge in accordance with test method ASTM D 1210-79. The solution was a translucent white in appearance and there was no evidence of alumina settling upon standing.

Example 2

20 g of a sol derived nano-alumina was added to an 80 g mixture of 1:1 ethylene glycol and N-methylpyrolidone. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was greater than 8 hegman units. The fineness of grind of the sample was checked using a Hegman Grind Gage in accordance with test method ASTM D 1210-79. The solution was translucent white in appearance and there was no evidence of alumina settling upon standing.

Example 3

20 g of a sol derived nano-alumina, was added to an 80 g mixture of 1:1 ethylene glycol and dimethylformamide. The sample was mixed using an Indco Model AS2AM, ¾ hp direct drive air stirrer outfitted with a cowls blade. The sample was mixed for 15 minutes. The resulting solution was thixotropic in nature. The sample exhibited a fineness of grind that was greater than 8 hegman units. The fineness of grind of the sample was checked using a Hegman Grind Gage in accordance with test method ASTM D 1210-79. The solution was translucent white in appearance and there was no evidence of alumina settling upon standing.

Example 4

20 g of a sol derived nano-alumina was added to an 80 g mixture of 1:1 ethylene glycol and phenol. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was greater than 8 hegman units. The fineness of grind of the sample was checked using a Hegman Grind Gage in accordance with test method ASTM D 1210-79. The solution was translucent white in appearance and there was no evidence of alumina settling upon standing.

Example 5

20 g of a sol derived nano-alumina, was added to an 80 g mixture of 1:1 propylene glycol and N-methylpyrolidone. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was approximately 6 hegman units. The fineness of grind of the sample was checked using a Hegman Grind Gage in accordance with test method ASTM D 1210-79. The solution was translucent white in appearance and there was no evidence of alumina settling upon standing.

Example 6

20 g of a sol derived nano-alumina was added to an 80 g mixture of 1:3 ethylene glycol and N-methylpyrolidone. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was greater than 8 hegman units. The fineness of grind of the sample was checked using a Hegman Grind Gage in accordance with test method ASTM D 1210-79. The solution was translucent white in appearance and there was no evidence of alumina settling upon standing.

Example 7

20 g of a sol derived nano-alumina was added to an 80 g mixture of 1:3 ethylene glycol and phenol. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that was greater than 8 hegman units. The fineness of grind of the sample was checked using a Hegman Grind Gage in accordance with test method ASTM D 1210-79. The solution was translucent white in appearance and there was no evidence of alumina settling upon standing.

Example 8

20 g of a fumed alumina was added to 80 g of ethylene glycol. The sample was mixed using an Indco Model AS2AM, ¾ hp direct drive air stirrer outfitted with a cowles blade. The sample was mixed for 15 minutes. The resulting solution was slightly thixotropic in nature. The sample exhibited a fineness of grind that was approximately 6.5 hegman units. The fineness of grind of the sample was checked using a Hegman Grind Gage in accordance with test method ASTM D 1210-79. The solution was a milky white in appearance with a minimal amount of alumina settling upon standing.

Example 9

20 g of a fumed alumina was added to an 80 g mixture of 1:1 ethylene glycol:N-methylpyrolidone. The sample was mixed using an Indco Model AS2AM, ¾ hp direct drive air stirrer outfitted with a cowles blade. The sample was mixed for 15 minutes. The resulting solution was thixotropic in nature. The sample exhibited a fineness of grind that approximately 5 hegman units. The fineness of grind of the sample was checked using a Hegman Grind Gage in accordance with test method ASTM D 1210-79. The solution was a milky white in appearance with a minimal amount of alumina settling upon standing.

Example 10

20 g of a fumed alumina was added to an 80 g mixture of 1:1 ethylene glycol:phenol. The sample was mixed using an Indco Model AS2AM, ¾ hp direct drive air stirrer outfitted with a cowles blade. The sample was mixed for 15 minutes. The resulting solution was slightly thixotropic in nature. The sample exhibited a fineness of grind that was approximately 6 hegman units. The fineness of grind of the sample was checked using a Hegman Grind Gage in accordance with test method ASTM D 1210-79. The solution was a milky white in appearance with a minimal amount of alumina settling upon standing.

Example 11

10 g of a sol derived nano-alumina was added to 100 g of ethylene glycol. The sample was mixed using an Indco Model AS2AM, ¾ hp direct drive air stirrer outfitted with a cowles blade. The sample was mixed for 15 minutes. The resulting solution was of low viscosity. The sample exhibited a fineness of grind that was greater than 8 hegman units. The fineness of grind of the sample was checked using a Hegman Grind Gauge in accordance with test method ASTM D 1210-79. The solution was a translucent white in appearance and there was no evidence of alumina settling upon standing.

Comparative Example 1

20 g of a sol derived nano-alumina was dispersed in 80 g of phenol. The sample was mixed using an Indco Model AS2AM, ¾ hp direct drive air stirrer outfitted with a cowles blade. The sample was mixed for 15 minutes. The resulting solution was not homogeneous and the mixture separated upon standing. The sample exhibited a fineness of grind that was less than 1 hegman unit. The fineness of grind of the sample was checked using a Hegman Grind Gage in accordance with test method ASTM D 1210-79. No evidence of dispersion was observed.

Comparative Example 2

20 g of a sol-derived alumina was dispersed in 80 g of 1,3 propanediol. The sample was mixed using an Indco Model AS2AM, ¾ hp direct drive air stirrer outfitted with a cowles blade. The sample was mixed for 15 minutes. The resulting solution was not homogeneous and the mixture separated upon standing. The sample exhibited a fineness of grind that was less than 1 hegman unit. The fineness of grind of the sample was checked using a Hegman Grind Gage in accordance with test method ASTM D 1210-79. No evidence of dispersion was observed.

Comparative Example 3

20 g of a sol derived nano-alumina was dispersed in 80 g of 1:1 ethylene glycol and dibasic ester. The sample was mixed using an Indco Model AS2AM, ¾ hp direct drive air stirrer outfitted with a cowles blade. The sample was mixed for 15 minutes. The resulting solution was not homogeneous and the mixture separated upon standing. The sample exhibited a fineness of grind that was less than 1 hegman unit. The fineness of grind of the sample was checked using a Hegman Grind Gage in accordance with test method ASTM D 1210-79. No evidence of dispersion was observed.

Comparative Example 4

20 g of a sol derived nano-alumina was dispersed in 80 g 1:1 ethylene glycol and glycol ether DM. The sample was mixed using an Indco Model AS2AM, ¾ hp direct drive air stirrer outfitted with a cowles blade. The sample was mixed for 15 minutes. The resulting solution was not homogeneous and the mixture separated upon standing. The sample exhibited a fineness of grind that was less than 1 hegman unit. The fineness of grind of the sample was checked using a Hegman Grind Gage in accordance with test method ASTM D 1210-79. No evidence of dispersion was observed.

The results of Examples 1-11 and Comparative Examples 1-4 are presented in table format in Table I below. As seen in these examples, when the sol derived nano-alumina is dispersed in a solution containing a diol (such as a glycol), and/or a phenolic or an amide based solvent, upon mixing, a nano-alumina solution is formed in which the nano-alumina is dispersed and does not settle upon standing.

wire. The nano-alumina dispersion solution is mixed with an imide resin in a ratio of about 0.5:100 to about 20:100 (or about 1:200 to about 1:5) on resin solids; and the mixture was then applied to a wire and cured about the wire. Preferably, the mixture is applied over a high temperature enamel coating for polyester wires. The imide coating used can be either a polyamide imide coating or a polyester imide coating. The resulting coating provides a wire having physical properties of wires generally available in the marketplace, but provides for improved abrasion, COF, or corona resistance.

Wire Sample 1: 100 g of the dispersion of Example 2 above was added to 333 g of Tritherm®A 981-M-30, a polyimide amide coating available from The P.D. George Company. The sample was mixed using an Indco Model AS2AM, ¾ hp direct drive air stirrer, outfitted with a three paddle propeller blade, for approximately 30 minutes. The resulting homogeneous solution was slightly green in color. The solution was applied as a topcoat over Terester®C 966-40 (a high-temperature enamel coating for polyester wires available from The P.D. George Company) made in accordance with the National Electrical Manufacturer's Association's (NEMA) MW35 construction onto a 1.0 mm copper wire and cured in a commercial enamel oven. The resulting wire was tested for corona resistance in an inverter duty application using a DEI DTS 1250A and an alternating current of ±1000V at 150° C. (~302° F.). The physical properties of the wire were equivalent to those commercially available in the marketplace.

TABLE I

| Example | Alumina & Type | Dispersion Solution | Grind Fineness (Hegman Units) | solution comments | Settling Upon Standing |
|---|---|---|---|---|---|
| 1 | 20 g Sol Derived | 80 g ethylene glycol | >8 | thixotropic, translucent white | no |
| 2 | 20 g Sol Derived | 80 g 1:1 ethylene glycol:N-methylpyrolidone | >8 | low viscosity, thixotropic, translucent white | no |
| 3 | 20 g Sol Derived | 80 g 1:1 ethylene glycol:dimethyl-formamide | >8 | low viscosity, thixotropic, translucent white | no |
| 4 | 20 g Sol Derived | 80 g 1:1 ethylene glycol:phenol | >8 | thixotropic, translucent white | no |
| 5 | 20 g Sol Derived | 80 g 1:1 propylene glycol:N-methylpyrolidone | ~6 | thixotropic, translucent white | no |
| 6 | 20 g Sol Derived | 80 g 1:3 ethylene glycol:N-methylpyrolidone | >8 | thixotropic, translucent white | no |
| 7 | 20 g Sol Derived | 80 g 1:3 ethylene glycol:phenol | >8 | thixotropic, translucent white | no |
| 8 | 20 g Fumed | 80 g ethylene glycol | ~6.5 | slightly thixotropic, milky white | minimal amount of settling |
| 9 | 20 g Fumed | 80 g 1:1 ethylene glycol:N-methylpyrolidone | ~5 | slightly thixotropic, milky white | minimal amount of settling |
| 10 | 20 g Fumed | 80 g 1:1 ethylene glycol:phenol | ~6 | slightly thixotropic, milky white | minimal amount of settling |
| 11 | 10 g Sol Derived | 100 g. ethylene glycol | >8 | low viscosity, translucent white | no |
| Comparative 1 | 20 g Sol Derived | 80 g phenol | <1 | not homogeneous | separated upon standing |
| Comparative 2 | 20 g Sol Derived | 80 g 1,3-propanediol | <1 | thixotropic, milky white, alumina only partially dispersed | separated upon standing |
| Comparative 3 | 20 g Sol Derived | 80 g 1:1 ethylene glycol:dibasic ester | <1 | not homogeneous, no evidence of dispersion observed | separated upon standing |
| comparative 4 | 20 g Sol Derived | 80 g 1:1 ethylene glycol:glycol ether DM | <1 | not homogeneous, no evidence of dispersion observed | separated upon standing |

Coating of a Wire with the Nano-Alumina Dispersion Solution

In the examples below, a nano-alumina dispersion solution was mixed with a resin solution to provide a coating for a Wire Sample 2: 100 g of the dispersion of Example 2 above, was added to 3333 g of Tritherm®A 981-M-30 from The P.D. George Company. The sample was mixed using an Indco Model AS2AM, ¾ hp direct drive air stirrer outfitted with a three paddle propeller blade for approximately 30 minutes. The resulting homogeneous solution was slightly green in color. The solution was applied as a topcoat over Terester®C 966-40 (NEMA MW35 construction) onto a 1.0 mm copper wire and cured in a commercial enamel oven. The resulting wire was tested for scrape resistance and coefficient of friction (COF) improvement. Scrape resistance was tested by the repeated scrape method using a Hippotronics Abrasion Scrape Tester Model AST-1 in accordance with test method NEMA MW 1000-1997 3.51.1.2. The repeated scrape resistance of Wire Sample 2 was improved compared to the control, by 110 scrapes to 85 scrapes respectively. The coefficient of friction (COF) was tested using an Ampac International Inc. NOVA 912 Dynamic & Static Coefficient of Friction Tester in accordance with manufacturer's guidelines. Wire Sample 2 was found to have improved static and dynamic COF compared to a control solution not having alumina. The static COF of the wire coated with alumina containing solution and the alumina free solution was 0.05 to 0.07 respectively, and the dynamic COF was 0.11 to 0.12 respectively.

Wire Sample 3: 100 g of the dispersion in Example 4 was added to 333 g of Teramide®A 3737-30 (a polyester-imide available from The P. D. George Company). The sample was mixed using an Indco Model AS2AM, ¾ hp direct drive air stirrer outfitted with a three paddle propeller blade for approximately 30 minutes. The solution was applied monolithically onto 1.0 mm copper wire and cured in a commercial enamel oven. The resulting wire was tested for corona resistance in an inverter duty application using a DEI DTS 1250A and alternating current of ±1000V at 150° C. The physical properties of the wire were equivalent to those commercially available in the marketplace.

As seen from the examples above, the wire samples coated with the dispersion of Example 2 (Wire examples 1 and 2) showed an improved scrape resistance and coefficient of friction.

Having thus described the invention, what is claimed and desired to be secured by Letters Patent is:

1. A method of coating a wire comprising:
   preparing a stable nano-alumina dispersion solution; the step of preparing the stable nano-alumina dispersion solution comprising dispersing nano-alumina particles into a diol solution containing a 1,2-diol for a selected period of time;
   mixing the nano-alumina dispersion solution with a resin to produce a coating mixture;
   applying the coating mixture to a wire; and
   curing the coating mixture on the wire.

2. The method of claim 1 wherein the diol solution contains a phenolic solvent or an amide based solvent.

3. The method of claim 1 wherein the 1,2-diol is chosen from the group consisting of ethylene glycol, 1,2 propanediol, and combinations thereof.

4. The method of claim 2 wherein the phenolic solvent is phenol or cresylic acid.

5. The method of claim 2 wherein the amide solvent is N-methylpyrolidone or dimethylformamide.

6. The method of claim 1 wherein the diol solution is (a) a solution of ethylene glycol and a phenolic solvent or (b) a solution of ethylene glycol and an amide based solvent.

7. The method of claim 6 wherein the ethylene glycol is mixed in a ratio of about 1:1 to about 3:1 with the phenolic solvent or the amide based solvent.

8. The method of claim 1 wherein the nano-alumina:diol solution ratio is about 1:4 to about 1:10.

9. The method of claim 1 wherein the resin coating is chosen from a group consisting of polyamide imide coatings, polyester imide coatings, polyester coatings, polyurethane coatings, polyimide coatings, and combinations thereof.

10. The method of claim 9 wherein the nano-alumina dispersion solution is mixed with the resin coating in a ratio of about 0.5:100 to about 20:100.

11. The method of claim 1 wherein the mixing step of dispersing of the alumina in the diol solution is performed under conditions which do not create high shear mixing.

12. A method of coating a wire comprising:
    preparing a stable, thixotropic nano-alumina dispersion solution; the step of preparing the stable, thixotropic nano-alumina dispersion solution comprising dispersing nano-alumina particles into a diol solution for a selected period of time; the diol solution comprising a 1,2-diol and a co-solvent; the 1,2-diol being chosen from the group consisting of ethylene glycol, 1,2 propanediol, and combinations thereof, and the co-solvent being a phenolic solvent or an amide based solvent;
    mixing the nano-alumina dispersion solution with a resin coating;
    applying the resulting coating mixture to a wire; and
    curing the resulting coating mixture on the wire.

* * * * *

UNITED STATES PATENT AND TRADEMARK OFFICE
CERTIFICATE OF CORRECTION

| | | |
|---|---|---|
| PATENT NO. | : 7,763,312 B2 | Page 1 of 1 |
| APPLICATION NO. | : 11/405280 | |
| DATED | : July 27, 2010 | |
| INVENTOR(S) | : Thomas Murray and Philip Meister | |

It is certified that error appears in the above-identified patent and that said Letters Patent is hereby corrected as shown below:

Column 4, line 1: Please remove "should".

Column 10, line 28 - Claim 11: Please remove "mixing".

Signed and Sealed this
Thirty-first Day of May, 2011

David J. Kappos
*Director of the United States Patent and Trademark Office*